Jan. 10, 1967   M. M. LIGHT   3,297,249
MAINTENANCE AID INDICATOR
Filed Oct. 12, 1965
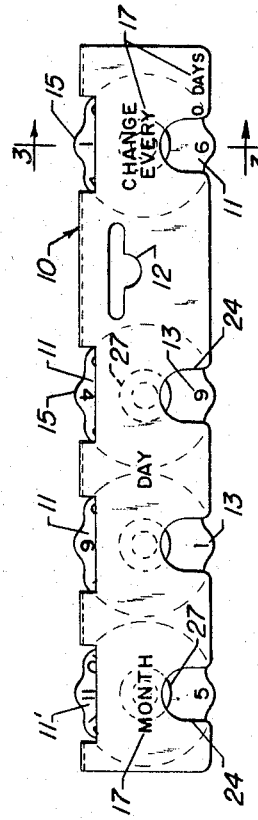
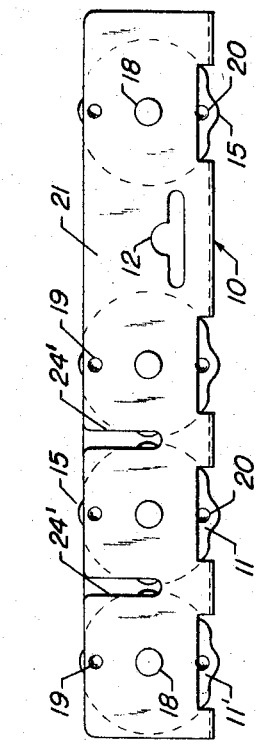
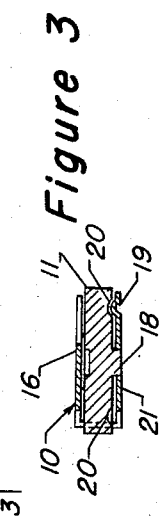
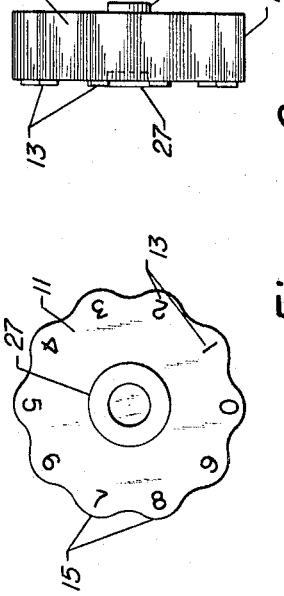
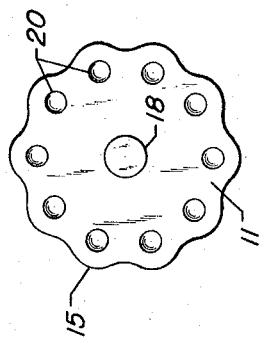
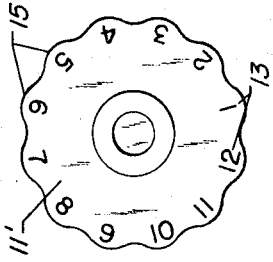
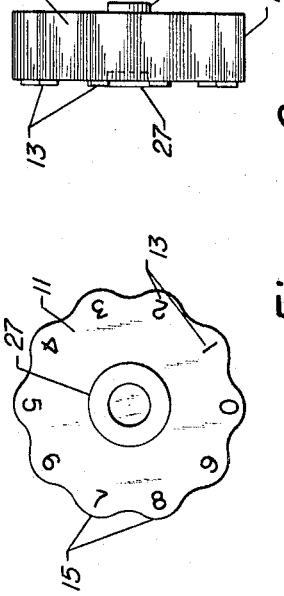
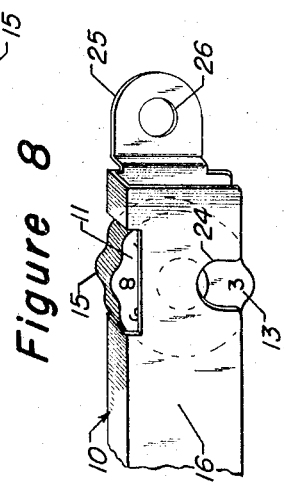
INVENTOR:
Maurice M. Light
BY:
Harold W. Bergendorf
ATTORNEY

United States Patent Office 3,297,249
Patented Jan. 10, 1967

3,297,249
MAINTENANCE AID INDICATOR
Maurice M. Light, 151 N. Kenilworth,
Oak Park, Ill. 60301
Filed Oct. 12, 1965, Ser. No. 495,159
1 Claim. (Cl. 235—114)

This application is a continuation-in-part of my co-pending application Serial Number 467,351 filed June 28, 1965.

This invention relates to a device to aid in maintenance service of articles which require periodic maintenance. The term maintenance as used herein is defined to include the terms oil, grease, clean, repair, replacement, reminder, inspections, etc. More specifically this invention relates to a low cost indicator which is affixed to the article to be maintenance serviced. In one of its embodiments, this invention relates to a date indicator to indicate the date at which the article was last serviced and/or the date at which the article is next to be serviced. Additionally, the indicator may be employed to indicate the frequency period of maintenance service whether such period be measured by time, mileage, cycles, counts, use, etc.

There are numerous articles located in the homes, automobiles, factories, etc., which require periodic maintenance service. For example, in automobiles, motor oil, water, lubrication parts, oil filters, air filters, tire pressure, transmission oil, batteries, spark plugs, ignition points, brake fluid, etc., all require periodic maintenance service. In the home there are numerous items which require periodic maintenance such as filters on air conditioners and furnaces, sump pumps, furnace blowers, attic fans, various painting jobs such as siding, gutters, downspouts, trim, etc., various clean jobs such as ovens, fireplaces, etc., and other chores for which reminders are desirable such as defrosting refrigerators, leaving messages for various delivery men, etc. In those homes having a power driven appliance such as a lawnmower, snow blower, edger, sweeper, etc., the motors require frequent maintenance and periodic oil changes. In the factory, as well as, other places in which machinery is employed, various machines require frequent maintenance service. In all of these locations it becomes a difficult chore to maintain records as to when a particular article was last serviced or should be next serviced. Furthermore, records tend to get lost or destroyed, pick up dirt and grease and frequently are illegible or otherwise unreadable. It is usually inconvenient to obtain these records in the field if they are centrally kept and this may result in articles either being over-serviced or under-serviced. In many cases no attempt is even made to keep records of maintenance service.

It is an object of this invention to correct the above mentioned difficulties encountered in maintenance service of articles.

It is another object of this invention to provide a low cost maintenance aid indicator.

It is a further object of this invention to promote the sale of items which are used in maintenance service.

It is still another object of this invention to place the maintenance aid indicator in a location convenient to aid in routine maintenance service.

It is a more specific object of this invention to have the time at which an article was last serviced or the time at which an article is next to be serviced and/or the frequency of service readily available to a maintenance serviceman.

It is another more specific object of this invention to attach the maintenance aid device directly to the article requiring periodic maintenance thereby eliminating other maintenance service record keeping.

These and other objects will become more apparent in the light of the following detailed description.

FIGURE 1 is the top view of an indicator for recording dates and recording the frequency of maintenance service.
FIGURE 2 is the bottom view of said indicator.
FIGURE 3 is a side view through section 3—3 of FIGURE 1.
FIGURE 4 is a top view of a 10 digit disc.
FIGURE 5 is a side view of the numbered disc.
FIGURE 6 is a bottom view of the numbered disc.
FIGURE 7 is a top view of a 12 digit disc.
FIGURE 8 shows a portion of the top view of an indicator having a mounting bracket as alternate means for attaching the indicator to an article.
FIGURE 9 shows the indicator attached to an oil filter housing.

In FIGURE 1, discs 11 and 11' are interposed in housing 10. Disc 11' is a 12 digit disc whereas discs 11 are 10 digit discs. Each disc 11 or 11' contains a series of numbers 13, one of which is exposed through opening 24 in the upper side 16 of housing 10. Additional information items 17 are carried by upper side 16 to give meaning to the exposed numbers. This is illustrated in the drawing wherein the word month is carried over the left most opening so that the number exposed corresponds to the month. Thus the number 1 is exposed if the month is January, 2 if February, etc. Likewise the word day is carried over the middle two openings so that the numbers exposed correspond to the day. These three numbers can be used to indicate any date during a given year. For example, if the date is May 19, the far left disc is rotated to expose the number 5, the adjacent disc is rotated to expose the number 1 and the next adjacent disc is rotated to expose the number 9. This is shown in FIGURE 1. If desired, additional discs may be interposed in the housing 10 to indicate the year. However, in most common maintenance jobs, the frequency of maintenance service is sufficiently short in time that a year indicator is not necessary. Other useful information can also be recorded by my device. For example, in a factory where there are several men assigned to the task of maintenance servicing of various machines each workman is given a number thus allowing a given workman to identify that he serviced a given machine by having a numbered disc indicating the workman's number and having him expose his number through the opening. Other variable information can be placed on a disc besides numbers such as, the days of the week, or means for checking off whether work has actually been done, etc. An alternate manner of counting may also be employed in this invention, namely, counting the number of days in a year. Thus starting with January 1 as the first day and December 31 as the three hundred and sixty-fifth day (except for leap year) the left most disc represents the hundreds digit, the adjacent disc represents the tens digit and the next adjacent disc represents the units digit. Thus, for the date of January 31, the left most digit is rotated to expose the number 0, the adjacent disc is rotated to expose the number 3 and the next adjacent disc is rotated to expose the number 1. For household and automobile maintenance, the first mentioned month-day system is generally preferred since the average person does not conveniently know which numbered day of the year it is. Other equivalent counting systems are intended to be included within the scope of this invention. Since there are 12 months in the year, the left most disc carries the numbers from 1 through 12 whereas the other discs carry the numbers from 0 through 9. The month indicating disc may be of larger size than the other discs in order to carry the extra two numbers, it may be the same size as the other discs but scaled down, as shown in FIGURE 7, or it may consist of two discs identical to the other 0–9 discs (in the latter case for the month of May the left disc is set to expose 0 and the right disc is set to expose 5, for November the left disc is set to expose 1 and the right disc is set to expose 1, etc.). Each of the discs are readily rotated by pushing on projecting members 15 with a human finger and any variable information item on the disc may thereby be exposed through opening 24. Other equivalent information may also be recorded and is considered to be within the scope of my invention. For instance, the indicator may be set up to record the date when the article was last serviced, the date at which the article is next to be serviced and the date that the article is actually serviced.

In addition to the foregoing date indicator, the disc on the far right side is employed to represent the frequency of maintenance service. Again information items 17 are carried by the upper side 16 of housing 10 to convey meaning to the variable numbers exposed in opening 24. The frequency indicator may be related to the elapse of time in any convenient unit such as, days, weeks, months or even years. The frequency may also be related to use such as, mileage when servicing an automobile, cycles when servicing punch presses, etc. For example, if the date indicator is attached to an oil filter and the frequency for changing the filter cartridge is 60 days, then the right hand disc is rotated to expose number 6, as shown in FIGURE 1, and the right hand side shows that the filter should be changed every 60 days. Any meaningful information including words and constant numbers may be directly carried by upper side 16 depending on the article to be serviced. More than one variable disc may also be employed depending on the information to be recorded. This frequency indicator has additional advantages, namely, acting as a reminder when an article should be serviced and the period between servicing. Frequently when a new article is installed, an installation book informs the installer as to the preferable frequency of maintenance service. These installation books frequently get lost or misplaced and an individual may not remember the required frequency. By attaching the indicator directly to the article and setting the frequency to the required information, it becomes a permanent maintenance indicator and no reliance is necessary on a book or on someone's memory. Furthermore, the use of this frequency indicator will help to promote the sale of items used in servicing the articles. Also shown in FIGURE 1 is aperture 12 through which a projecting arm of an article may be passed in order to attach the housing to the article. Aperture 12 is shaped by overlapping a narrow, long, flat opening upon a circular opening in order to permit the passage therethrough of most shaped projecting arms.

FIGURE 2 illustrates housing 10 from the bottom view with lower side 21 exposed. A center portion 18 of the numbered disc is slid over a hole in the lower side 21 and snapped into proper position by fitting into said hole. Portion 18 centers the disc in the correct position but since the fit is not tight, portion 18 is able to rotate freely in said hole. The upper side and lower side are somewhat flexible and when the disc is inserted into its proper position, said sides along with portion 18 serve to hold the disc in the housing while still allowing the disc to be readily rotated about the hole surrounding portion 18. The lower side contains protrusions 19 which extend upward from the lower side 21 toward the upper side 16. A given protrusion is shaped and positioned to engage one of a series of grooves in the lower side of its corresponding disc. The purpose for the protrusion and groove is to secure the disc in a predetermined rotational position and thereby expose the desired number without danger of the disc accidentally rotating and thereby changing the exposed meaningful information item on the upper side of the indicator. For this reason, the disc may only be rotated by applying sufficient pressure on the side of the disc with a human finger to deliberately rotate the disc and expose a new desired information item. The edge of the disc having a rough saw tooth surface due to projecting members 15 allows sufficient tangential force to be applied by a human finger to the disc to readily rotate it. Preferentially a slot 24′ is cut out of lower side 21 between two discs when the two discs are located close to each other in order to minimize the danger of accidentally rotating the second disc when deliberately rotating the first disc. When the first disc is rotated the protrusion in side 21 tends to push the lower side away from the disc and this could permit the second disc to disengage its protrusion and cause the second disc to rotate. Slot 24′ minimizes the danger since the slot forms a gap in part in the lower side which permits the lower side below the first disc to flex without overly disturbing the lower side below the second disc. Grooves 20 in disc 11 are also shown toward the rear edge of housing 10 from this bottom view.

FIGURE 3 is a side view of section 3—3 in FIGURE 1 showing a side view of the assembled indicator. Housing 10 having upper side 16 and lower side 21 contains discs interposed therebetween. Protrusion 19 engages the groove 20 in disc 11 and the center portion 18 of disc 11 projects downward through a hole in side 21. It should be noted that the distance between the upper side and the lower side is less at the front edge (right hand side of FIGURE 3) than said distance at the rear edge. This geometry caused protrusion 19 to more firmly engage groove 20 and maintain the disc securely in position. Preferably said distance is about 25% less at the front edge than at the rear edge.

FIGURE 4 is a top view of a ten digit disc 11 showing an equal number of projecting members 15 and numbers 13 carried thereon. Although this figure shows numbers 0 through 9, a lesser or a greater number of informational items may be advantageously employed.

FIGURE 5 is a side view of numbered disc 11 having the center portion 18 projecting outward from the bottom side of the disc. A boss 27 is attached to the top side of disc 11 to keep upper side 16 sufficiently apart to prevent the coined numbers 13 from jamming against said upper side when the disc is rotated.

FIGURE 6 is a bottom view of numbered disc 11 showing an equal number of projecting members 15 and grooves 20. Center portion 18 is exposed in this view.

FIGURE 7 is a top view of a twelve digit disc 11′ showing an equal number of projecting members 15 and numbers 13 carried thereon. This particular disc is especially suitable for indicating the month of the year or other formation having 12 variables. It is apparent that other discs may be designed for any particular purpose having variable information items thereon.

FIGURE 8 shows an alternate embodiment for attaching the housing to the article and consists of a mounting bracket 25 having a hole 26 therein. Fastening means are inserted through hole 26 which are attached to the article to be maintenanced serviced. Preferably the mounting bracket is attached to the lower side or even projecting below as shown in FIGURE 8 in order to elevate the discs and readily allow a human finger access to permit rotation of the discs.

FIGURE 9 shows the assembled indicator attached to oil filter housing 23. Top 22 of the oil filter housing is detached in order to remove the spent oil filter and replace with a new filter. The mounting bracket type of fastening means is employed on the indicator to attach it to the oil filter. The outer surface of the oil filter contains two short screws which pass through mounting bracket holes 26 and two nuts are attached to the screws to hold the indicator thereon.

The manner of attachment of the indicator to the oil filter housing, or for that matter any article is any convenient attaching means. Among the more convenient attaching means are: (1) Use of a permanent magnet incorporated into the lower side of housing 10 and relying on magnetic attraction to hold the recorder to the article. This is, of course, only effective when the article has some part which is constructed out of the magnetic iron family. This can be conveniently accomplished by making projecting member 18 out of a permanent magnet and extending its length to beyond the edge of lower side 21; (2) attaching mounting brackets with holes therein at both ends of the lower side of housing 10 and inserting fastening means such as rivets, nut and bolt assemblies, screws, etc. through the holes and securing the fastening means to the article as shown in FIGURES 8 and 9; (3) forming a hole in housing 10 through both the upper side and lower side and inserting fastening means through the hole to secure the indicator to the article as shown in FIGURES 1 and 2. If the article has a projecting arm, the arm may be inserted through the hole. Likewise, a key chain or snap loop assembly is passed through the hole in the housing and attached to some part of the assembly. It is to be understood that other fastening means such as glue, epoxy resins, masking tape and etc. may be equally suitable to attach the indicator to the article and these means are intended to be included within my invention. Whatever attaching means are employed, it is preferable that the indicator be permanently attached to the article so that the indicator cannot be easily removed from the article. This feature is desirable in order to prevent losing or mislaying the indicator.

The housing is preferably constructed of a strong, sturdy metal such as, aluminum, iron, magnesium, carbon steel, stainless steel and various alloys although other sturdy materials such as heavy duty plastic may also be advantageously employed. The surface may be coated to retard rust. In environments wherein the indicator may be exposed to excessive temperatures, the housing must be constructed to withstand the heat or cold.

The discs are constructed out of materials such as the foregoing described metals, plastics, etc. The numbers 13 may be engraved or coined on the disc and may be painted a different color than the disc in order to stand out or alternately a circular sheet having numbers 13 imprinted thereon may be attached to the top side of the disc and held there by means such as temperature resistant glue. Numbers which are raised from the top surface of the disc (coined) are preferable since they are easier to clean and less expensive to manufacture. Center portion 18 is constructed either out of the same material as the disc and formed by a single stamping operation or a separate metal sleeve which is inserted into the disc by means such as a friction fit. The disc is attached to the housing by spreading the lower side from the upper side, inserting the center portion 18 through the hole in the lower side of the housing and allowing the upper side and lower side to return to their original position as shown in FIGURE 3.

When a number of articles to be serviced are located in one central location it may be preferable to install a maintenance board in that location having a number of indicators mounted on the board. Each of the indicators is for a particular article in that general location. This may be convenient in those instances where the articles are located in hard to reach places. A good example of a preferable location for a maintenance board is in the engine compartment under the hood of an automobile. A number of the parts that require periodic maintenance are located in hard to see and hard to reach places. A maintenance board can be easily installed at any convenient location under the hood. Since the overall length of the housing of the indicator is from about 2 inches to about 4 inches and the width is from about ⅜ to about 1 inch, a number of indicators can be mounted on one maintenance board without the necessity of using a very large board. Thus, for an indicator of the type and scale shown in the drawing, 12 indicators can be readily installed on a board whose dimensions are 6 inches by 6 inches while still having plenty of space between indicators to rotate the discs.

Other types of indicators which when directly attached to the article are also suitable for maintenance servicing. For example, a device, such as a luggage name plate or license tag having a cover housing, a sheet contained therein and a transparent window in the housing to read the sheet may be satisfactorily employed as an indicator. Thus, each time the article is maintenance serviced, the old sheet is removed and a new sheet inserted into the housing. Written on the sheet are the various maintenance information items. The sheet may be made of paper, smudge resistant plastic, etc. and the information items are written in pencil or ink. Again the housing is preferably directly attached to the article to be maintenance serviced. Thus, a serviceman would carry a pad of sheets and after servicing each article, would remove the old sheet, write out information on the new sheet and insert the new sheet into the cover housing. Another example of an indicator which is useful in maintenance servicing is a strip of soft metal which is either attached to the article by means hereinbefore described or alternately is incorporated into the article itself as an integral part thereof. The date and frequency information is scribed into the soft metal with a hard object such as a screw driver and after each maintenance service the old information is removed by hammering it out, tearing it off or shaving it off. Likewise, another suitable indicator is a man made mica impression pad having information scribed thereon.

In the embodiment shown in the drawing the length of the housing is about 2⅝ inches and the diameter of the disc is about ½ an inch. The numbers carried by the discs are about 3/32 of an inch in length and the diameter of the openings are about 3/16 of an inch.

I claim as my invention:

An indicator to locate maintenance information on an article receiving maintenance service which comprises in combination:

- a housing attached to the article having an upper side and a lower side, the distance between the upper side and the lower side at the front edge of the indicator being less than the distance between the upper side and the lower side at the rear edge of the indicator;
- at least two discs interposed between the upper side and the lower side attached at the center area on the bottom side of the disc to the lower side of the housing, said disc being rotatable about the area of attachment;
- an opening in the upper side of the housing for each disc;
- a series of information items carried by each disc and positioned to expose at least one of said items on each disc through the openings in the upper side of the housing;
- a protrusion for each disc attached to the lower side of the housing to engage one of a series of grooves and secure the disc in a predetermined rotational position to expose at least one predetermined item from each disc through the opening; and
- a slot area cut out partially along the lower side to prevent accidental rotation of one disc when resetting an exposed item on an adjacent disc.

(References on following page)

References Cited by the Examiner

UNITED STATES PATENTS

| | | | |
|---|---|---|---|
| 1,333,686 | 3/1920 | Spotswood | 40—70 |
| 1,500,407 | 7/1924 | McLavey | 235—114 |
| 1,515,122 | 11/1924 | Keys | |
| 1,528,376 | 3/1925 | Jerabek | 40—70 |
| 1,547,673 | 7/1925 | Mulvehill | 235—114 |
| 1,951,022 | 3/1934 | Iverson | 40—70 |
| 2,145,984 | 2/1939 | Knutson | 40—70 |
| 2,474,432 | 6/1949 | Lowe | 235—114 |
| 2,702,954 | 3/1955 | Cline et al. | |
| 2,787,069 | 4/1957 | Ferguson et al. | 40—70 |
| 2,866,601 | 12/1958 | Naber | 235—114 |
| 2,996,247 | 8/1961 | Shell | 235—114 |
| 3,122,851 | 3/1964 | Sepe | 40—70 |

RICHARD B. WILKINSON, *Primary Examiner.*

W. F. BAUER, L. J. CAPOZI, T. J. ANDERSON,
*Assistant Examiners.*